United States Patent
Brandolini

(10) Patent No.: US 6,432,512 B1
(45) Date of Patent: Aug. 13, 2002

(54) FOAM PLANK LAMINATE

(75) Inventor: Maurizio Brandolini, Milan (IT)

(73) Assignee: Sealed Air Corporation (US), Saddlebrook, NJ (US)

( * ) Notice: Subject to any disclaimer, the term of this patent is extended or adjusted under 35 U.S.C. 154(b) by 0 days.

(21) Appl. No.: 09/495,605

(22) Filed: Feb. 1, 2000

(51) Int. Cl.$^7$ .............................. B32B 3/12; B32B 3/26
(52) U.S. Cl. .................... 428/159; 428/172; 428/310.5; 428/316.6
(58) Field of Search ................. 428/159, 172, 428/310.5, 316.6

(56) References Cited

U.S. PATENT DOCUMENTS

| | | | |
|---|---|---|---|
| 4,183,984 A | 1/1980 | Browers et al. | 428/81 |
| 5,424,016 A | 6/1995 | Kolosowski | 264/156 |
| 5,776,390 A | 7/1998 | Fiddelaers et al. | 264/50 |
| 6,207,254 B1 * | 3/2001 | Lee et al. | 428/159 |

FOREIGN PATENT DOCUMENTS

| GB | 2102808 | 2/1983 |
|---|---|---|
| WO | WO 91/03372 | 3/1991 |

OTHER PUBLICATIONS

Applicant wishes to bring to the attention of the examiner a patent application filed by Lee et al. on Jan. 28, 1999 entitled: Partially Perforated Foam (USSN 09/238,989).

* cited by examiner

Primary Examiner—Blaine Copenheaver
Assistant Examiner—Leanna Roché
(74) Attorney, Agent, or Firm—Thomas C. Lagaly

(57) ABSTRACT

A foam plank laminate of thermoplastic material comprises at least two expanded foam sheets, both partially perforated, and laminated with the perforated surfaces facing each other and the smooth non perforated surfaces as the outer plank surfaces.

The foam plank laminate can be obtained by an industrially acceptable production method as the partial perforation of the forming foam sheets accelerates the removal of a majority of the blowing agent from the foam structure, thus drastically reducing the curing time, and at the same time it has impermeability, good mechanical properties, and an attractive appearance.

11 Claims, 4 Drawing Sheets

FOAM PLANK LAMINATE

The present invention refers to foam sheet laminates, such as those used for instance for packaging, construction, and sports, with good flexural and compression strength and resistance to bending.

BACKGROUND OF THE INVENTION

Foamed products, which find use as packaging, cushioning, insulating and structural materials, typically consist of a phase of open or closed pores or cells dispersed throughout a polymer matrix. A wide array of processes have been devised for developing the cell phase in these products, including adding a gaseous "blowing agent" to the polymer during processing, producing a gaseous blowing agent by chemical reaction within the polymer during processing and forming the product from polymer granules to obtain a cellular structure. In one particularly popular process, a gaseous blowing agent is incorporated into a molten thermoplastic material to form a mixture which may then be molded to a desired shape, such as by extrusion. After molding, applied heat and/or reduced pressure causes the blowing agent to expand, forming a cellular structure within the thermoplastic matrix. The effectiveness of a particular blowing agent will depend largely upon the polymer composition in which it is incorporated, the method of incorporation, the process conditions, the additives used, and the products sought.

Blowing agents work by expanding the polymer to produce a cellular structure having far less density than the polymer itself. In processes in which a blowing agent is incorporated into a molten thermoplastic polymer, bubbles of gas form around "nucleation sites" and are expanded by heat or reduced pressure. A nucleation site is a small particle or a conglomerate of small particles that promotes the formation of a gas bubble in the polymer. Additives may be incorporated into the polymer to promote nucleation for a particular blowing agent and, consequently, a more uniform pore distribution.

Once bubbles of the blowing agent have expanded to form the cellular structure, the structure is maintained by replacing the blowing agent in the cells with air. Diffusivity of the blowing agent out of the cells relative to air coming into the cells impacts the stability of the foam over time and whether the cells of the foam may collapse. Additives may be incorporated into the polymer and process conditions may be adjusted to assist in controlling the diffusivity of the blowing agent, to promote foam stability, and to limit collapse of the foam to acceptable limits.

Many methods are available for adding a blowing agent to a polymer during processing to produce a foam. In one method pertinent to the present invention, the blowing agent is mixed with a molten thermoplastic polymer under pressure, and the mixture is then extruded through a forming die of a desired configuration. Plank, which can be cut to a desired shape and thin foam sheets may also be produced in this manner.

Prior art processes for forming expanded foam products from thermoplastic polymers, typically used halogenated hydrocarbons as blowing agents. The halogenated hydrocarbons include the chlorofluorocarbons ("CFCs") and hydrochlorofluorocarbons ("HCFCs"). CFCs and HCFCs are readily impregnable in thermoplastic polymers and are readily expandable under relatively mild conditions. CFCs and HCFCs generally produce foams of high quality with a minimum of processing difficulty. The pore size is controllable, the foam has good stability with minimum tendency to collapse after a period of time, and the surface characteristics of the foam are smooth and desirable. Also, CFCs, HCFCs and other halogenated hydrocarbons typically are either not flammable or are of low flammability, which greatly reduces the care with which they may be used. These compounds have the further advantage of low toxicity. However CFCs, HCFCs and other halogenated hydrocarbons have been linked to ozone depletion in the atmosphere. As a result of concern over the ozone layer, the use of these materials is being phased out in favour of materials which are more friendly to the ozone layer, such as hydrocarbons.

Although hydrocarbons are readily available, inexpensive and very compatible with polyethylene and other polymer matrix materials, thereby permitting wide processing variability, they present their own unique problems. Foremost among these problems is the greater flammability of these materials. Other problems with hydrocarbon blowing agents may include toxicity or environmental incompatibility. Moreover, the hydrocarbon blowing agents are slow to permeate through the expanded foam structure, such that the flammability and other problems associated with these materials persist in the foam structures for longer periods of time. Safety concerns have therefore mandated that manufacturers of foam structures store them for excessively long periods of time to enable the blowing agents therein to dissipate to levels below their lowest explosive limit so that the products are safe enough to be shipped to and used by customers.

A solution to the problem associated with the use of hydrocarbon blowing agents has been provided in the past by perforating the foam plank with a multiplicity of channels extending from one surface of the structure to the opposite surface.

Perforated foam plank have been commercialized worldwide by the present applicant in the eighties and a method for providing accelerated release of a blowing agent from a plastic foam by perforating it to form channels therein free of direction with respect to the longitudinal extension of the foam, has been described in U.S. Pat. No. 5,424,016.

The presence of these channels through the entire thickness of the plank however decreases the mechanical properties of the expanded foam plank, including its compression strength, resistance to creep, cushioning ability and the like. Furthermore a perforated foam plank can only be employed in those applications where impermeability is not required as water drops and other liquids can easily penetrate through the open pores on both plank surfaces. Another disadvantage of this method resides in the poorly attractive appearance of the plank where pores open on the surfaces.

U.S. Pat. No. 5,776,390 describes perforating an expanded foam sheet by a multiplicity of channels extending from one surface of the sheet to about 60 to 97% of the sheet thickness. Said perforation, hereinafter referred to as "partial perforation", leads to a foam sheet wherein one of the surfaces does not have any holes thereon ("non perforated surface") while the other has the desired pattern of holes appearing thereon ("perforated surface"). The problem with the approach described in U.S. Pat. No. 5,776,390 is that in order to prevent residual stresses to develop in the foam and thus decrease the sheet mechanical properties, perforation needs to be carried out when the extruded foam plank has been stabilized, what generally occurs about one hour after the extrusion. This means that perforation needs to be carried out off-line if foam warpage has to be controlled. Furthermore the use of a partially perforated foam plank highly restricts the applications thereof as at least one of the plank surfaces is not impermeable.

Despite the efforts that have been made in the past, there remains a need for an expanded foam plank that can be obtained by an industrially acceptable production method which accelerates the removal of a majority of the blowing agent from the expanded foam structure and maintains impermeability, good mechanical properties, and an attractive appearance.

SUMMARY OF THE INVENTION

The present invention addresses these needs.

The present invention refers to a foam plank laminate of thermoplastic material that comprise at least two foam sheets, both partially perforated, and laminated with the perforated surfaces facing each other and the smooth non perforated surfaces as the outer plank surfaces.

It has now been found in fact that if a plank of a given thickness is obtained by laminating at least two pre-formed, partially perforated, foam sheets in such a way that the non perforated smooth surfaces thereof become the plank outer surfaces, the thus obtained laminate, besides being impermeable and therefore suitable for any type of applications, has mechanical properties that are almost comparable to those of a non perforated plank of the same overall thickness and better than those of a perforated plank of the same overall thickness. It also been found that in order to achieve these mechanical properties in the final plank laminate it is not necessary to wait until the expanded foam of the forming sheets has been completely stabilized but that perforation of the foam sheets to be laminated according to the present invention can easily be made in-line, soon after extrusion, thus highly simplifying the manufacturing process.

A first object of the present invention is therefore an expanded foam plank laminate of thermoplastic material comprising a first partially perforated expanded foam sheet having a first surface which is not perforated and a second surface which is perforated, and a second partially perforated expanded foam sheet having a first surface which is non perforated and a second surface which is perforated, wherein the non perforated surfaces of the above forming sheets are the outer surfaces of the end expanded foam plank.

In one embodiment of the present invention the expanded foam plank laminate consists of only two partially perforated foam sheets that are laminated with the respective perforated surfaces directly adhered one to the other, leaving the respective non perforated surfaces as the foam plank laminate outer surfaces.

In another embodiment the foam plank laminate comprises more than two foam sheets, wherein one or more foam sheets are positioned between the first and the second partially perforated foam sheets and the non perforated respective surfaces of said first and second foam sheets are the foam plank laminate outer surfaces. In such a case the inner foam sheets can be perforated, either partially or completely, or non perforated. Preferably however they are at least partially perforated.

BRIEF DESCRIPTION OF THE DRAWINGS

The novel features of the present invention and the context within which they are set will be better understood upon reviewing the following specification together with the drawings.

DETAILED DESCRIPTION

Figure 1:
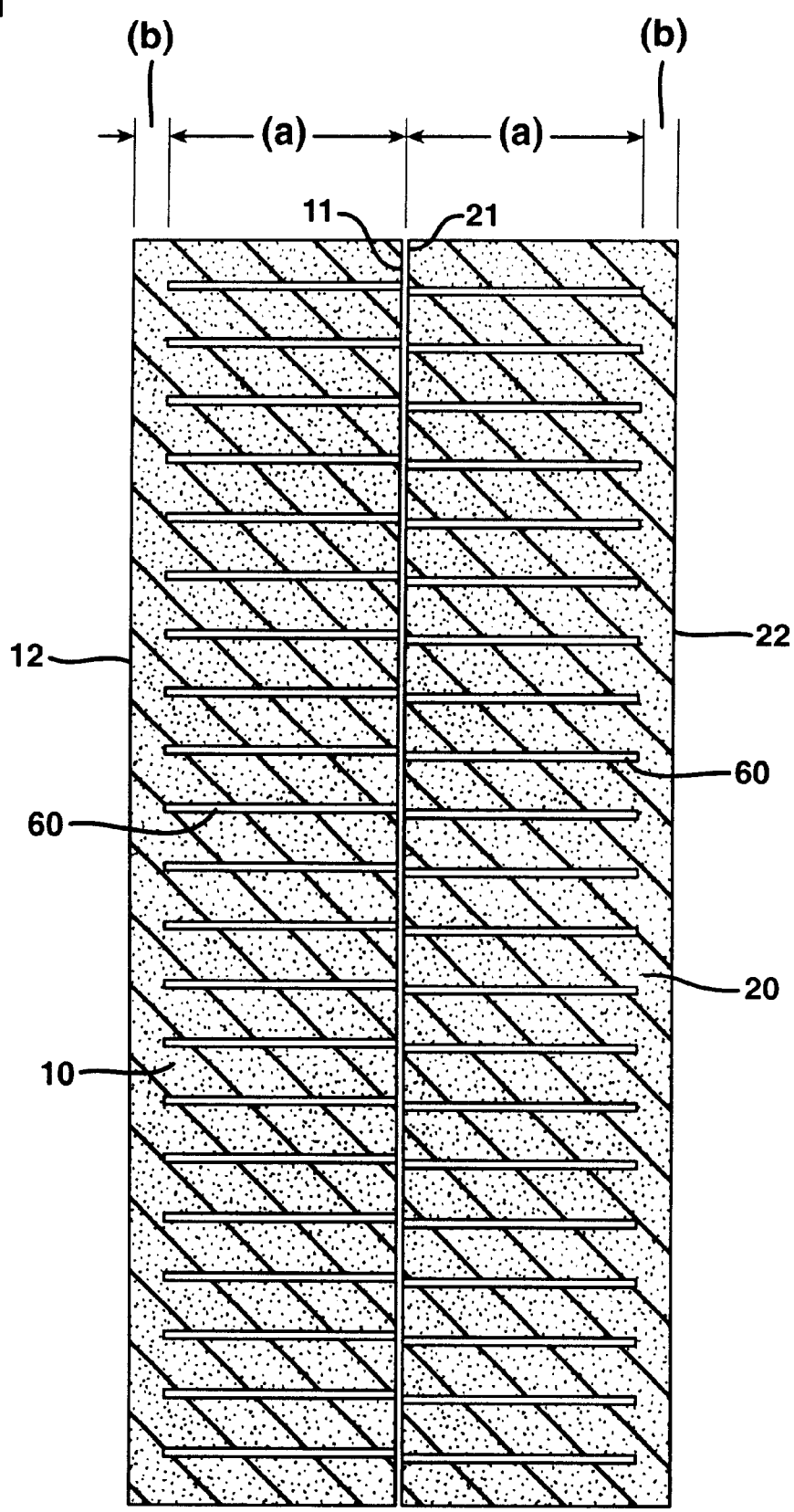
FIG. 1 is a schematic cross-sectional view of a foam plank laminate according to one embodiment of the present invention composed of only two foam sheets laminated together.
Figure 2:
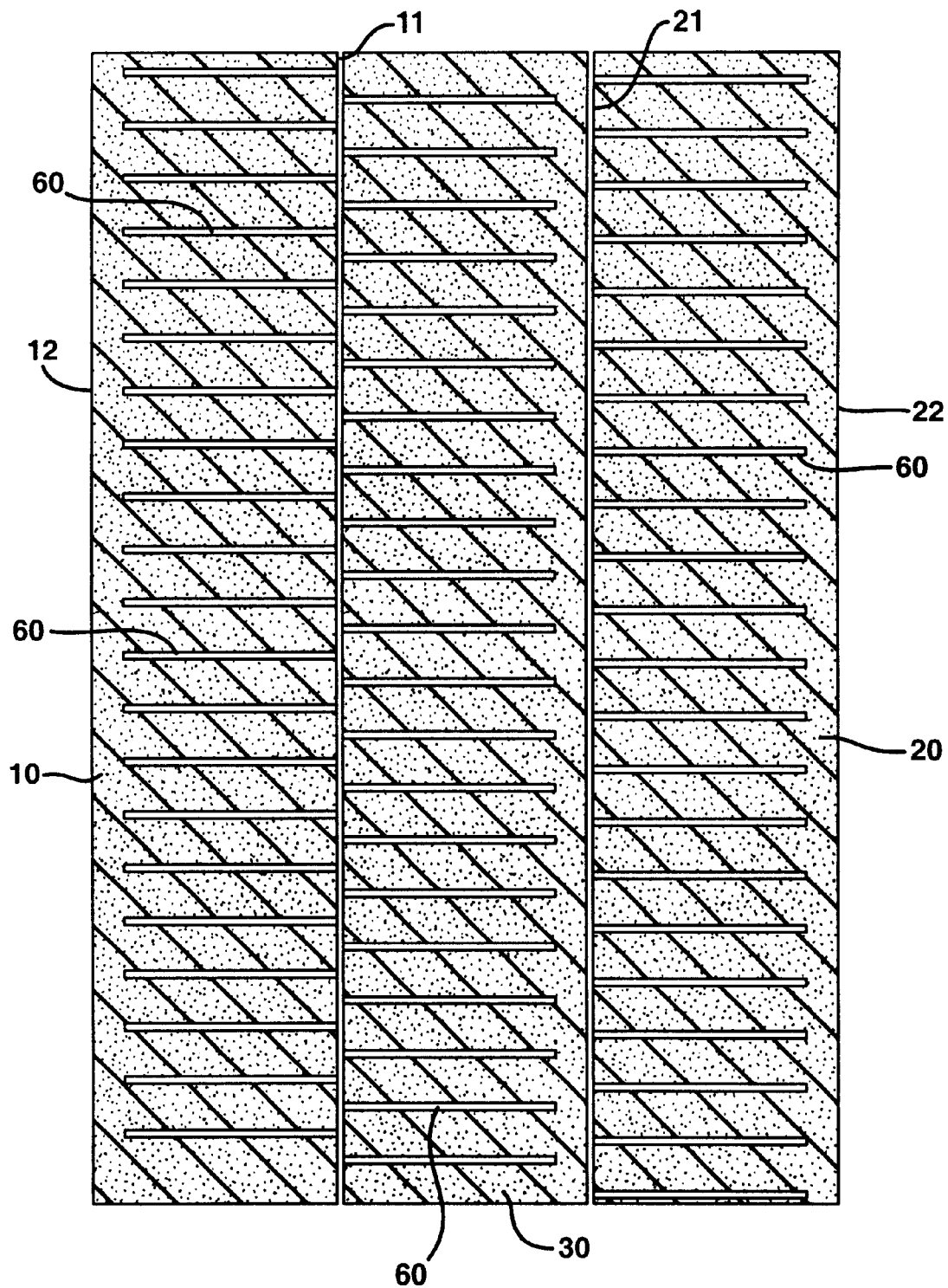
FIG. 2 and FIG. 3 are schematic cross-sectional views of foam plank laminates according to another embodiment of the present invention wherein more than two foamed sheets are employed for the manufacture of the plank. In particular the foam plank laminates of FIG. 2 and FIG. 3 are composed respectively of three and four foam sheets laminated together, all partially perforated.
Figure 3:
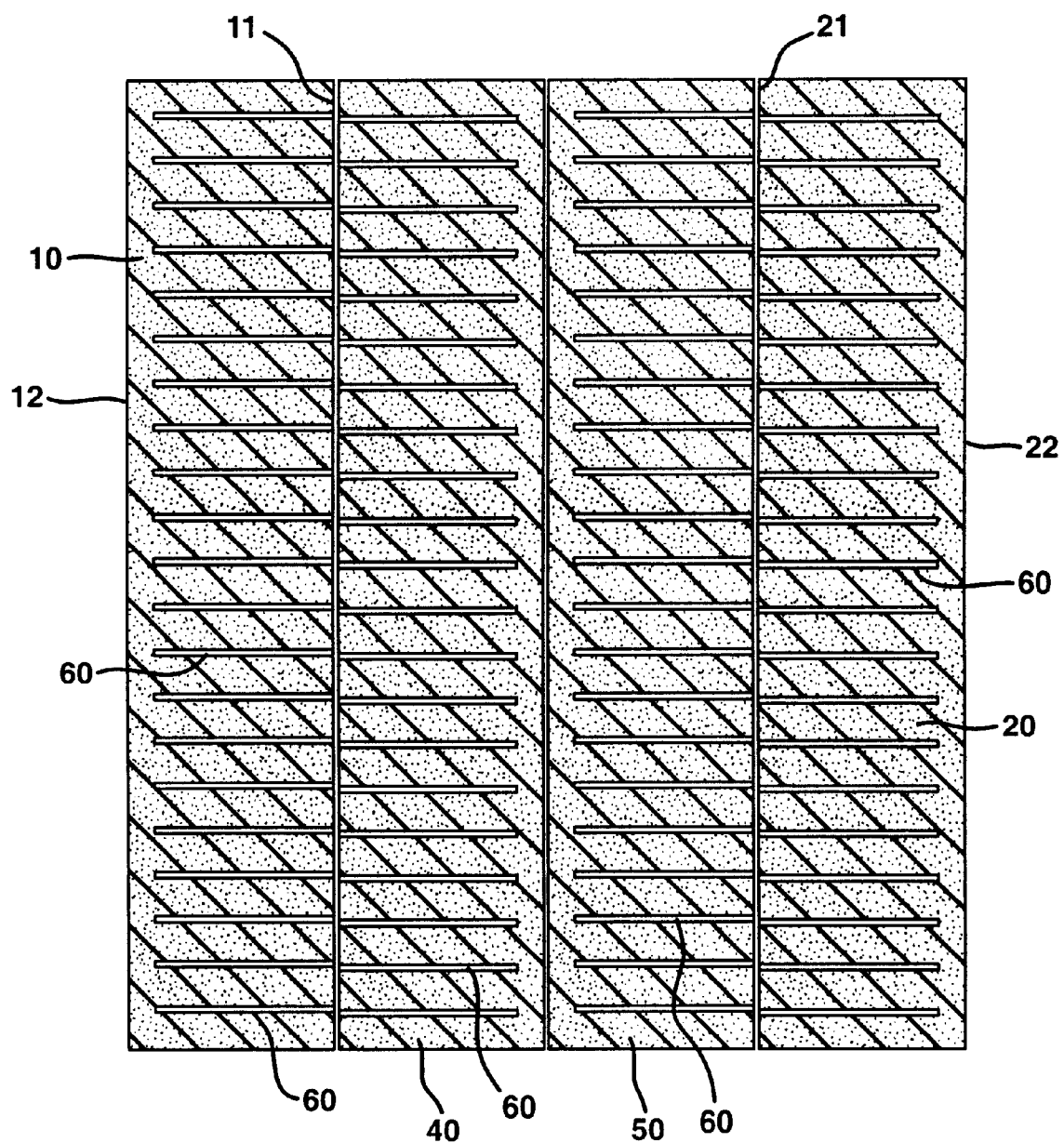

A foam plank laminate according to the present invention is illustrated in FIG. 1, FIG. 2 and FIG. 3. In said Figures the first partially perforated foam sheet is referenced by numeral 10 and the second partially perforated foam sheet by numeral 20. The perforated surfaces are references respectively by numerals 11 and 21 and the smooth non perforated surfaces are referenced respectively by numerals 12 and 22. A multiplicity of channels 60 extend into the foam sheets from the perforated surfaces 11 and 21.

In FIG. 2 wherein one additional foam sheets is positioned between the first and the second partially perforated foam sheets and in FIG. 3 where two additional foam sheets are positioned between the first and the second partially perforated foam sheets, said additional sheets are referenced by the numerals 30, and 40 and 50 respectively. In all these embodiments the non perforated respective surfaces of the first and second foam sheets are the foam plank laminate outer surfaces.

The thermoplastic materials suitable for the foams of the forming sheets include any foamable thermoplastic or thermosetting materials, including blends of two or more thermoplastic materials, blends of two or more thermosetting materials, or blends of thermoplastic materials with thermosetting materials.

Suitable polymers include i.a. polyolefins, polystyrene, polyurethanes, polyesters including polyethylene terephthalate, and polyisocyanurates, with polyolefins being particularly preferred.

Polyolefins are thermoplastic polymers derived from unsaturated hydrocarbons containing the ethylene or diene functional groups.

In particular, the term "polyolefin" refers to any polymerized olefin, which can be linear, branched, cyclic, aromatic, substituted, or unsubstituted. More specifically, included in the term polyolefin are homo-polymers of olefin, co-polymers of olefin, co-polymers of an olefin and a non-olefinic comonomer copolymerizable with the olefin, such as vinyl monomers, modified polymers thereof, and the like. Specific examples include ethylene homo-polymers, ethylene-α-olefin copolymers, propylene homo-polymers, propylene-α-olefin copolymers, butene homo-polymers, butene-α-olefin copolymers, ethylene-vinyl acetate copolymers, ethylene-ethyl acrylate copolymers, ethylene-butyl acrylate copolymers, ethylene-methyl acrylate copolymers, ionomer resins, and modified polyolefins.

Preferably with the term polyolefin reference is made to polymers of ethylene, the higher α-olefins, and the dienes.

Among the more commercially important polyolefins are polyethylene, polypropylene, polybutene, and their copolymers, including ethylene-α-olefin copolymers such as linear low density polyethylenes, and blends of the foregoing materials.

Polyethylene is particularly useful in the practice of the invention.

The overall thickness of the foam plank is typically up to about 150 mm, preferably up to about 130 mm, and even more preferably up to about 110 mm. The thickness of the forming foam sheets will depend on the overall thickness desired and on the number of foam sheets laminated together. Typically the thickness of each forming sheet is comprised between from about 8 mm to about 80 mm, preferably between from about 9 mm to about 70 mm, and more preferably between from about 10 mm to about 60 mm.

In the partially perforated forming sheets, the channels 60 typically extend up to a perforation depth of from about 50 to about 97% of the thickness of the expanded foam forming sheets 10 and 20. Preferably they extend up to a perforation depth of about 55 to about 95% and more preferably to a perforation depth of from about 60 to about 90%, indicated with (a) in FIG. 1. The thickness of the non perforated foam, indicated with (b) in FIG. 1, is however at least 1 mm, preferably at least 1.5 mm, and more preferably at least 2 mm.

The channels 60 may have any cross-sectional shape, including circular, oval, square, rectangular or other polygonal configuration. They have a diameter or corresponding cross-sectional size of between about 0.5 and about 3.0 mm, preferably of between about 0.8 and about 2.5 mm and more preferably of between about 1.0 and about 2.0 mm.

They are uniformly dispersed over the perforated surfaces 11 and 21, with a spacing between adjacent channels that depends on the % perforation area desired. Typical perforation areas range from about 0.5% to about 4%, preferably from about 0.8% to about 3%, and more preferably from about 1.0% to about 2%.

Spacing between adjacent channels is generally of between t/5 and 2t, wherein t is the thickness of the foam sheet.

Figure 4:
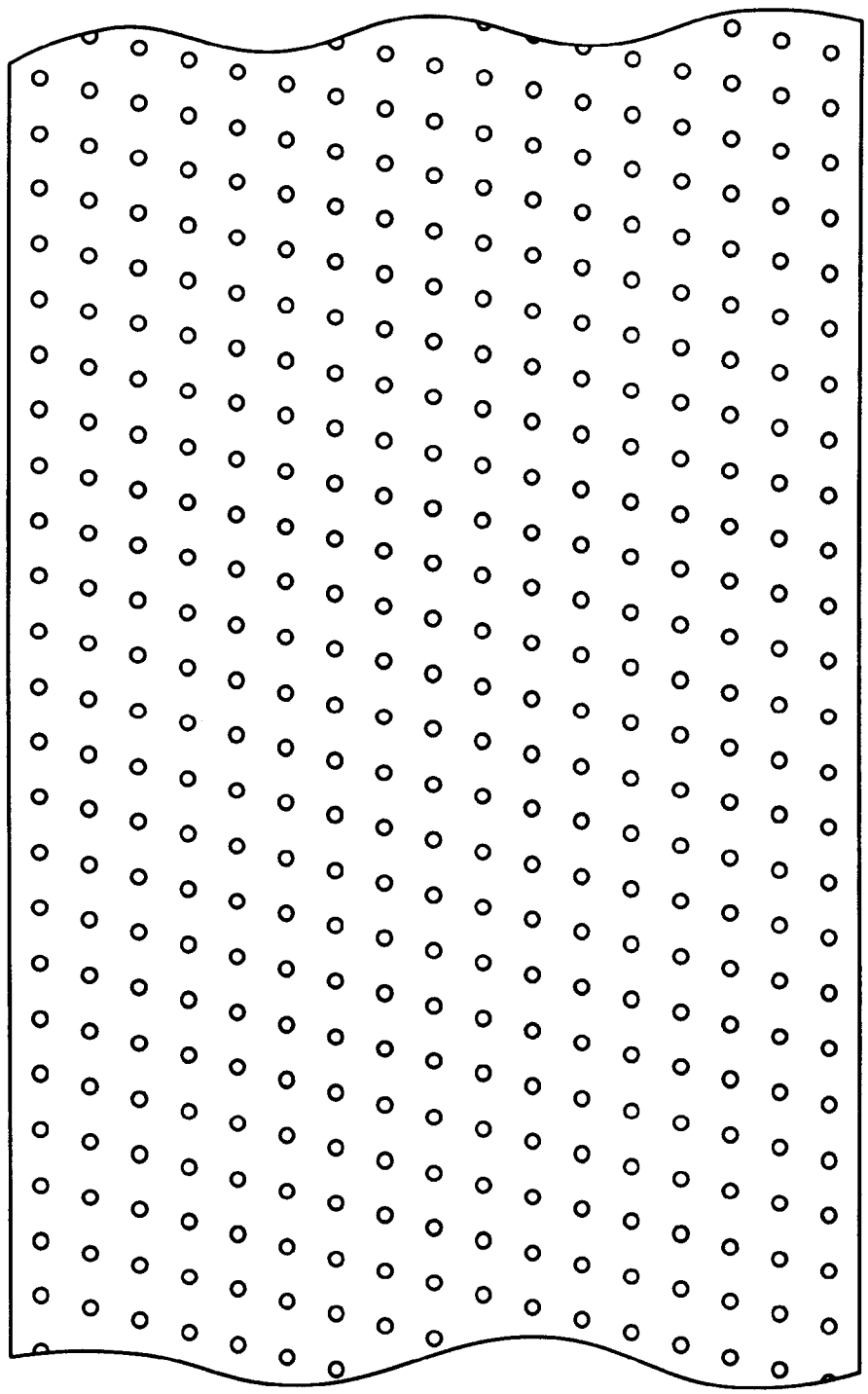
FIG. 4 is a schematic top plan view of one of the forming partially perforated sheets, showing the pattern of perforations on the perforated surface.

FIG. 4 illustrates an example of a perforation pattern wherein the perforations are in a quincux configuration and the spacing between the holes is about 8 mm and corresponds to about ½ of the thickness of the foam sheet. Spacing may however be different in the two directions, with a larger spacing in the longitudinal or machine direction. In a preferred embodiment, spacing in the longitudinal direction may range from 2 to 24 mm, depending on the thickness of the foam sheet and on the average diameter of the holes, while spacing in the transverse direction may range from about 2 to about 16 mm.

In the process for making the foam sheets by foam extrusion, any of the known blowing agents can be employed. Suitable volatile blowing agents include fluorocarbons, chlorofluorocarbons, hydrofluorocarbons, hydrochlorofluorocarbons, alkyl halides, such as methyl chloride and ethyl chloride, and hydrocarbons.

Other blowing agents that can be employed in the production of the foam sheets to be laminated according to the present invention, include air, carbon dioxide, nitrogen, argon water, and the like.

The blowing agent may as well consist of a mixture of two or more of any of the above blowing agents.

Other suitable blowing agents include chemical blowing agents such as ammonium and azo type compounds, including ammonium carbonate, ammonium bicarbonate, potassium bicarbonate, diazoaminobenzene, diazoaminotoluene, azodicarbonamide, diazoisobutyronitrile, and the like agents.

Preferred blowing agents in accordance with the present invention are hydrocarbons, including butane, isobutane, pentane, isopentane, hexane, isohexane, heptane, propane, and the like, including combinations of two or more of these materials.

A particularly preferred blowing agent for use with polyethylene is isobutane.

Although the blowing agents may be flammable or non flammable, the process according to the present invention is particularly advantageous in connection with flammable blowing agents because of the accelerated release of the blowing agent that is provided by the invention.

However, with both flammable and non flammable blowing agents, lamination of the partially perforated expanded foam sheets according to the present invention can be carried out at an early stage as the accelerated release of the blowing agent solves the problem associated with blister formation at the sheet interfaces.

In addition to the polymer and the blowing agent, the mixtures for forming the foam sheets of the present invention may include one or more additives for enhancing the properties of the foam and the forming process.

For example elastomeric components such as polyisobutylene, polybutadiene, ethylene-propylene rubber may be incorporated into the mixture.

Other potential additives include cross-linking agents, extrusion aids, antioxidants, colorants, pigments, etc. as desired, all of which are conventional in the art.

The mixture may also include one or more other customary additives for regulating cell formation and/or cell size and distribution in the foam product.

Such materials are for example permeability modifiers such as esters and amides of fatty acids, e.g. stearamides and stearates, e.g. stearyl stearamide, zinc stearate, glycerol monostearate, and nucleating agents e.g. zinc oxide, zirconium oxide, talc, and the like.

Foam extrusion is then carried out as known in the art, typically by extrusion of the polymer/blowing agent mixture through a shaped die having dimensions selected to produce an expanded foam sheet having the desired dimensions.

Within the die the mixture is under high pressure which prevents the foam from expanding. As it exits the die, however, the mixture is exposed to a low pressure environment, such as the atmospheric pressure. This sudden drop in pressure causes bubble expansion, or foaming, of the sheet.

The foam sheet has a top surface and a bottom surface generally parallel to the top surface and a plurality of pores or cells dispersed throughout the polymer matrix. Immediately after cell formation, the cells are filled almost entirely with the blowing agent.

In order to facilitate the diffusion of the blowing agent from the cells, according to the present invention the foam expansion step is followed by a short cooling step and then by a partial perforation of the foam sheet.

Cooling preferably occurs at a temperature below room temperature, typically comprised between about 5 and about 15° C. Higher temperatures, up to the ambient temperature may however be employed for a slightly longer time.

Perforation is then accomplished by puncturing the foam with a multiplicity of pointed sharp objects, such as needles, pins, spikes, nails or the like.

The polymer matrix must be sufficiently cooled not to be overly distorted upon perforation. This is generally achieved by prolonging cooling for a period of time that depending on the thickness of the foam sheet, may range from about few seconds, e.g. 5–10 s, up to about 10–12 minutes. Longer times can obviously be applied but for the preparation of the laminate of the present invention this is not necessary.

Partial perforation can be easily carried out by using any conventional needle-punching device. As an example a suitable needle-punching device can be made up by two rolls, one of which equipped with a rubber covering and the other one studded with needles. The spacing between the two rolls, that are driven in opposite directions at the same peripheral speed, can be adjusted depending on the thickness of the foam sheets that is passed in between the two rolls and the perforation depth desired. Alternatively a suitable needle-punching device can be a plate with needles mounted thereon. Said plate that is arranged in parallel to the plane of the foam sheet, moves vertically and horizontally. The horizontal velocity corresponds to the take-off speed of the foam web and the punching step is executed by the simultaneous vertical motion of the plate in the direction of the foam web.

Although channels 60 are depicted in the figures as being oriented substantially perpendicular to the extrusion or longitudinal direction of the foam sheets 10 and 20, this needs not to be the case. Thus channels 60 may be formed at an oblique angle relative to the extrusion direction. Angles of between about 30° and about 120° relative to the extrusion direction are preferred, with angles of about 90° being most preferred.

As indicated above, partial perforation is carried out up to a depth of from about 50 to about 97% of the thickness of the foam sheets, preferably up to a depth of about 55 to about 95% and more preferably up to a depth of from about 60 to about 90%.

It is carried out anyway so as to leave at least a portion 1 mm, preferably at least 1.5 mm, and more preferably at least 2 mm thick non perforated. Said non perforated portion is indicated in the Figures as (b).

The thus obtained partially perforated foamed sheets are then laminated together only after the storage period necessary to reduce the content of blowing gas in the foam to the desired value.

The laminated foam structure can be produced using any conventional lamination technique, including heat-lamination, and glue-lamination.

Heat-lamination is a process in which at least two sheets of foam materials are brought together under pressure and heat to join the materials.

The foam sheets are fed together with pressure exerted by two turning rollers. Immediately prior to the materials meeting in the nip of the rollers, heat is applied to the surfaces which are about to be pressed together. The heat can be supplied by hot air guns, infrared heaters, or a combination thereof. Heat can be applied to both foam sheets or only to one. The heat makes the perforated surface of the foam sheet tacky by creating local regions of melting on the surface. The foam sheets passing through the rollers nip are joined by a bond upon cooling.

A similar laminate can be made by applying a glue to the perforated surface of one or both sheets prior to the foam passing through the nip rolls. Said coating can be made by any of the conventional coating techniques and optionally the substrate sheet that received the coating is first passed through an in-line dryer to remove the solvent or to activate the coating, before being pressed together with the other sheet.

When the laminate comprises more than two forming sheets, any combination of the above methods and any order for combining the various sheets can be employed.

In particular it is preferred to laminate one sheet at a time, or to laminate together two laminates of two or more laminated sheets, provided the outer surfaces of the end foam plank are the non perforated surfaces of two partially perforated foam sheets.

It is however also possible to laminate all the foam sheets together simultaneously.

Depending on the thickness of the end foam plank, lamination can be made in batch, to provide thick planks of a desired size, or in continuous to provide thinner roll stocks of laminate.

The mechanical properties of the laminates of the present invention are only slightly inferior to those of a non perforated laminate of comparable thickness and better than those of a perforated plank of comparable thickness.

The lamination of the partially perforated sheets with the non perforated surfaces as the laminated plank outer surfaces will guarantee not only sufficient mechanical properties but also the plank impermeability as well as an attractive smooth appearance of the end laminate.

Finally, the partial perforation of the sheets allows an easy and quick removal of the blowing gas soon after extrusion thus reducing the curing time and improving the safety of the overall manufacturing process.

To further illustrate the present invention, the following non-limiting examples are provided.

EXAMPLE 1

A low density polyethylene resin having a MI of 2.2 g/10 min and a density of 0.924 g/cm$^3$ is combined in the feed zone of a twin screw extruder with 1 wt. % of a nucleating agent (talc) and 1.25 wt. % of a permeability modifier (glyceryl mono-stearate). The homogeneous mixture thus obtained is conveyed to the melt zone of the extruder and heated to a temperature of about 165° C. to form a molten mass. This temperature is maintained up to the gas mixing chamber where a butane blowing agent (32 kg/h) is injected into the molten mass. The temperature of this mixture lowers to about 90° C. and then it increases up to about 145° C. in the filter zone. The stabilized mixture is then extruded through a round die at a temperature of about 100° C. and expanded to form a 13-mm thick foam sheet.

The obtained foamed tube is cooled by passing over a calibrator cooled to about 10° C. for about 20 s, and then cut open. The flat web thus obtained is perforated in-line. Perforation is carried out using a rotary perforator with needles of cylindrical configuration and diameter of about 1.42 mm in a square configuration every 8 mm in the transverse direction and every 16 mm in the longitudinal direction. The perforator is adjusted to give a perforation depth of about 80–85%.

After curing at room and atmospheric temperature for 5 days, two roll stocks of foam sheets obtained as above are heat-laminated with the perforated surfaces facing each other. Hot air injected between the two sheets which are then pressed together between nip rolls is used to heat the surfaces.

Two additional partially perforated foam sheets obtained as above are then heat-laminated in the same manner to the outer surfaces of this two-sheet plank. The overall plank laminate thus obtained is therefore composed of four partially perforated foam sheets wherein the two outer sheets of the plank are laminated via the perforated surfaces while the non perforated surfaces remain as the end plank outer surfaces.

Immediately after the lamination and 10 days after, the above plank laminate was tested to determine its compressive strength in comparison with a plank of four non perforated sheets of the same thickness (Comparative Example 1) and a plank of four partially perforated sheets (obtained as above) wherein however the outer surfaces of the end plank are perforated (Comparative Example 2).

In these tests the foam is compressed by 50 and 70 percent respectively and then released for three times and the compression strength at the fourth compression step is evaluated.

The test is carried out and the results are reported according to standard test method DIN 53577. The compression strength is reported in Pa.

|  | Day after lamination | | | |
| --- | --- | --- | --- | --- |
|  | Zero | | Ten | |
| Example | 50% compr. | 70% compr. | 50% compr. | 70% compr. |
| Example 1 | 108.60 | 250.25 | 100.20 | 239.60 |
| Comp. Example 1 | 119.46 | 273.15 | 104.90 | 238.20 |
| Comp. Example 2 | 96.79 | 230.91 | 91.38 | 222.30 |

What is claimed is:

1. A foam plank laminate of thermoplastic material comprising a first partially perforated foam sheet having a first surface which is not perforated and a second surface which is perforated, and a second partially perforated sheet having a first surface which is non perforated and a second surface which is perforated, wherein the non perforated surfaces of the above forming sheets are the outer surfaces of the end foam plank.

2. The foam plank laminate of claim 1 which consists of only two partially perforated foam sheets, wherein the perforated surface of the first partially perforated foam sheet is laminated directly to the perforated surface of the second partially perforated foam sheet.

3. The foam plank laminate of claim 1 which comprises more than two foam sheets, wherein one or more foam sheets are positioned between the first and the second partially perforated foam sheets and wherein the non perforated respective surfaces of said first and second foam sheets are the foam plank laminate outer surfaces.

4. The foam plank of claim 3 wherein said one or more additional foam sheets positioned between the first and the second partially perforated foam sheets, are perforated, either partially or completely.

5. The foam plank laminate of claim 1 wherein the thermoplastic material is a polyolefin.

6. The foam plank of claim 5 wherein the polyolefin is polyethylene.

7. The foam plank laminate of claim 1 which has an overall thickness up to about 150 mm, obtained by lamination of at least two partially perforated foam sheets of a thickness comprised between from about 8 mm to about 80 mm.

8. The foam plank laminate of claim 1 wherein the partially perforated foam sheets contain a multiplicity of channels, having cross-sectional size of between about 0.5 and about 3.0 mm, extending up to a perforation depth of from about 50 to about 97% of the thickness of the foam sheets, provided at least 1 mm of non perforated foam is left.

9. The foam plank laminate of claim 8 wherein the perforations are uniformly dispersed over the perforated surface with a spacing between adjacent channels comprised between about t/5 and about 2t wherein t is the thickness of the foam sheet.

10. A process of manufacturing the foam plank laminate of claim 1 which comprises
   i) extrusion foaming the first and second foam sheets of thermoplastic material having a thickness of from about 8 mm to about 80 mm,
   ii) partially perforating them in-line to create a multiplicity of channels therein, having cross-sectional size of between about 0.5 and about 3.0 mm, extending up to a perforation depth of from about 50 to about 97% of the thickness of the foam sheets but leaving at least 1 mm of non perforated foam, and
   iii) heat-, or glue-laminating the partially perforated sheets, keeping the non perforated surfaces thereof as the outer surfaces of the end foam plank.

11. The process of claim 10 wherein the partial perforation is carried out within 20 minutes from the extrusion.

* * * * *